(12) United States Patent  
Meyer

(10) Patent No.: US 9,374,947 B2
(45) Date of Patent: Jun. 28, 2016

(54) WALL PLANTING MODULE

(71) Applicant: Molly Meyer, LLC, Chicago, IL (US)

(72) Inventor: Molly Meyer, Chicago, IL (US)

(73) Assignee: Molly Meyer, LLC, Chicago, IL (US)

(*) Notice: Subject to any disclaimer, the term of this patent is extended or adjusted under 35 U.S.C. 154(b) by 212 days.

(21) Appl. No.: 14/203,656

(22) Filed: Mar. 11, 2014

(65) Prior Publication Data

US 2014/0325907 A1  Nov. 6, 2014

Related U.S. Application Data

(63) Continuation-in-part of application No. 29/453,929, filed on May 3, 2013, now Pat. No. Des. 720,947.

(51) Int. Cl.
*A01G 9/00* (2006.01)
*A01G 9/02* (2006.01)

(52) U.S. Cl.
CPC ............... *A01G 9/023* (2013.01); *A01G 9/025* (2013.01); *Y02P 60/244* (2015.11)

(58) Field of Classification Search
CPC ....... A01G 9/022; A01G 9/023; A01G 9/025; A01G 1/007
USPC .............................. 47/65.9, 82, 83
See application file for complete search history.

(56) References Cited

U.S. PATENT DOCUMENTS

| | | |
|---|---|---|
| 3,772,827 A | 11/1973 | Ware |
| 4,268,994 A | 5/1981 | Urai |
| 4,295,296 A * | 10/1981 | Kinghorn ............... A01G 9/025 47/82 |
| 4,419,843 A | 12/1983 | Johnson, Sr. |
| 4,869,019 A | 9/1989 | Ehrlich |
| 5,826,375 A | 10/1998 | Black |
| 6,634,138 B2 | 10/2003 | Katzman |
| 6,725,601 B2 | 4/2004 | Chick |
| 7,832,144 B2 | 11/2010 | Corradi |
| 7,921,599 B2 | 4/2011 | Irwin |
| 7,926,224 B1 | 4/2011 | Koumoudis |
| 8,141,294 B2 | 3/2012 | Bribach et al. |
| 8,281,517 B2 | 10/2012 | MacKenzie |
| 2008/0110086 A1 | 5/2008 | Julia |
| 2009/0223126 A1 | 9/2009 | Garner et al. |
| 2010/0095584 A1 | 4/2010 | Huet et al. |
| 2010/0146855 A1 | 6/2010 | Ma |
| 2011/0107667 A1 | 5/2011 | Laurence et al. |
| 2011/0215937 A1 | 9/2011 | Carroll et al. |
| 2011/0258925 A1 * | 10/2011 | Baker ..................... A01G 9/023 47/65.8 |
| 2012/0017506 A1 | 1/2012 | Zhao et al. |
| 2012/0066972 A1 * | 3/2012 | Lin ........................ A01G 9/024 47/82 |
| 2012/0227320 A1 | 9/2012 | Dos Santos |

* cited by examiner

*Primary Examiner* — Monica Williams
*Assistant Examiner* — Aaron Rodziwicz
(74) *Attorney, Agent, or Firm* — Woodard, Emhardt, Moriarty, McNett & Henry LLP

(57) ABSTRACT

Embodiments include a containment unit for a living wall that includes a rear wall with two side walls, a top and a liquid collection trough at the bottom with several ribs extending down the front of the containment unit between the side walls, where the ribs are angled and arranged relative to each other to define vertically stacked openings between sequential ribs that forms horizontal growing surfaces when the containment unit is filled with loose plant growth medium.

19 Claims, 10 Drawing Sheets

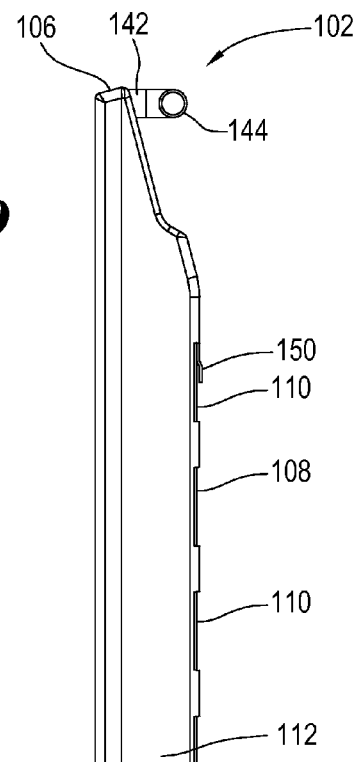
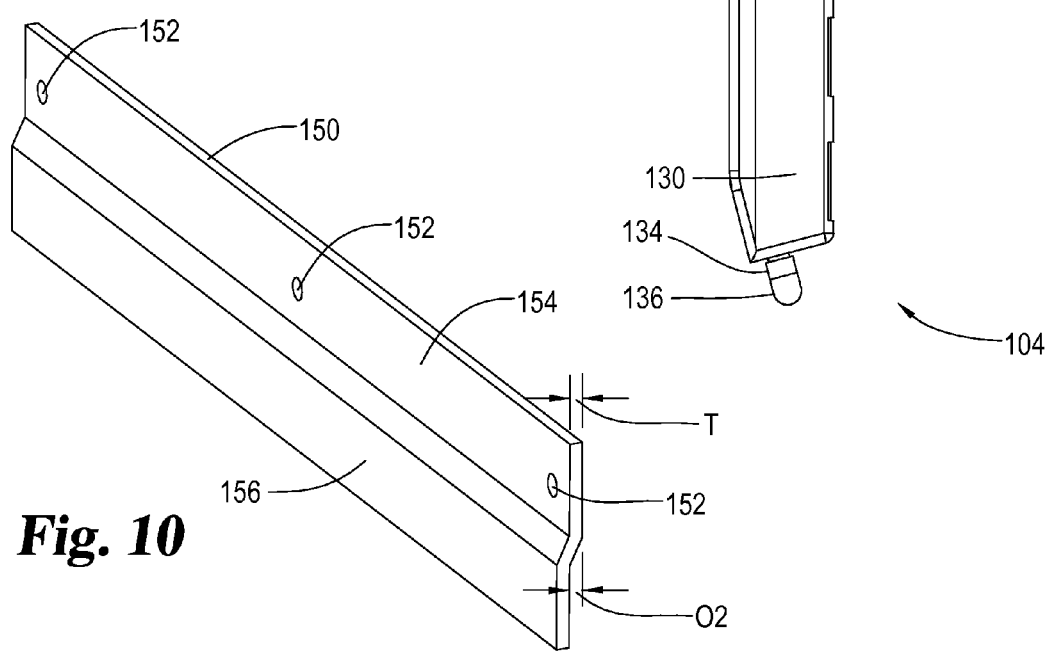

WALL PLANTING MODULE

CROSS REFERENCE TO RELATED APPLICATIONS

This application is a continuation-in-part of U.S. Design application No. 29/453,929, filed May 3, 2013, which is hereby incorporated by reference.

FIELD OF THE INVENTION

The present disclosure relates to wall planting modules.

BACKGROUND

There are generally two categories of green wall systems: green facades and living walls. A green facade is a wall covered with climbing vegetation, for example, vines. In green façade systems, there may be a screen or trellis structure that provides a structure for climbing plants to grow on, rather than allowing those plants to adhere directly to the building envelope. Green facades generally root the plants in the ground, although some systems include planters with elevated root containers interstitially mounted to the structural wall. Green facades are exterior green wall systems. Green facades are generally only used for exterior applications.

Conversely, a living wall is a wall covered with vegetation with the plants (and roots) contained in growing media contained within the wall itself. The plants used in a living wall are not limited to climbing plants such as vines, but may also include many more plant options depending on application and climate. The visual effect of a living wall system is to create a tapestry of greenery. Living wall systems can be installed in both interior and exterior applications.

Prior art living wall systems generally include one or more of the following layers (from structural wall outwards): waterproof barrier, structural support and fasteners, irrigation tubing and system, drainage elements, growing media containment element(s), retention or capillary fabric, growing media, plants, and supplemental lighting (for interior and low-light applications). Different prior art living wall systems may vary the order of these layers and composition of each layer according to the design intent, application, and vendor of the green wall.

Prior art living wall systems may be constructed either by placing each layer one at a time: mounting structural components, arranging drainage elements, assembling irrigation system, unrolling and mounting retention fabrics, distributing growing media and planting individual plants; or by pre-growing modular elements in a greenhouse, where the modules may be filled with growing media and plants, and adhering these modules to the structural wall once irrigation and drainage elements are constructed.

Living wall systems have various methods for containing growing media. In the layer-by-layer systems, retention fabrics may be attached to structural wall in pinches, rather than flat, to create pockets where a small amount of growing media is inserted and individual plants may be planted. In modular systems, there may be various methods. One method uses felt bags filled with growing media and planted. Another method uses plastic or metal frames lined with filter fabric and filled with growing media; plants may be planted in horizontal units and the unit is grown at the greenhouse at gradually steeper slopes until the units are vertical or near vertical. A third method uses a rigid growing media (such as rock wool) that is formed like a cupcake pan, with individual plant root balls inserted in each 'cupcake' space, and grown at a greenhouse at gradually steeper slopes until the units are vertical. For these methods for growing media containment in living wall systems, the rooting environment consists of isolated units of growing media, the plant growth potential is limited to the space directly out in front of the wall because plants above shade plants below, and the replacement plants for plants that die may be at a disadvantage for establishment because the young replacement plants must establish themselves in a vertical growing environment, rather than horizontal and gradually steeper until vertical.

BRIEF DESCRIPTION OF THE DRAWINGS

FIG. 9 is a side elevational view of the FIG. 8 containment unit including irrigation system piping and drainage piping.
FIG. 10 is a perspective view of a Z-connector.

DESCRIPTION OF THE ILLUSTRATED EMBODIMENTS

Figure 1:
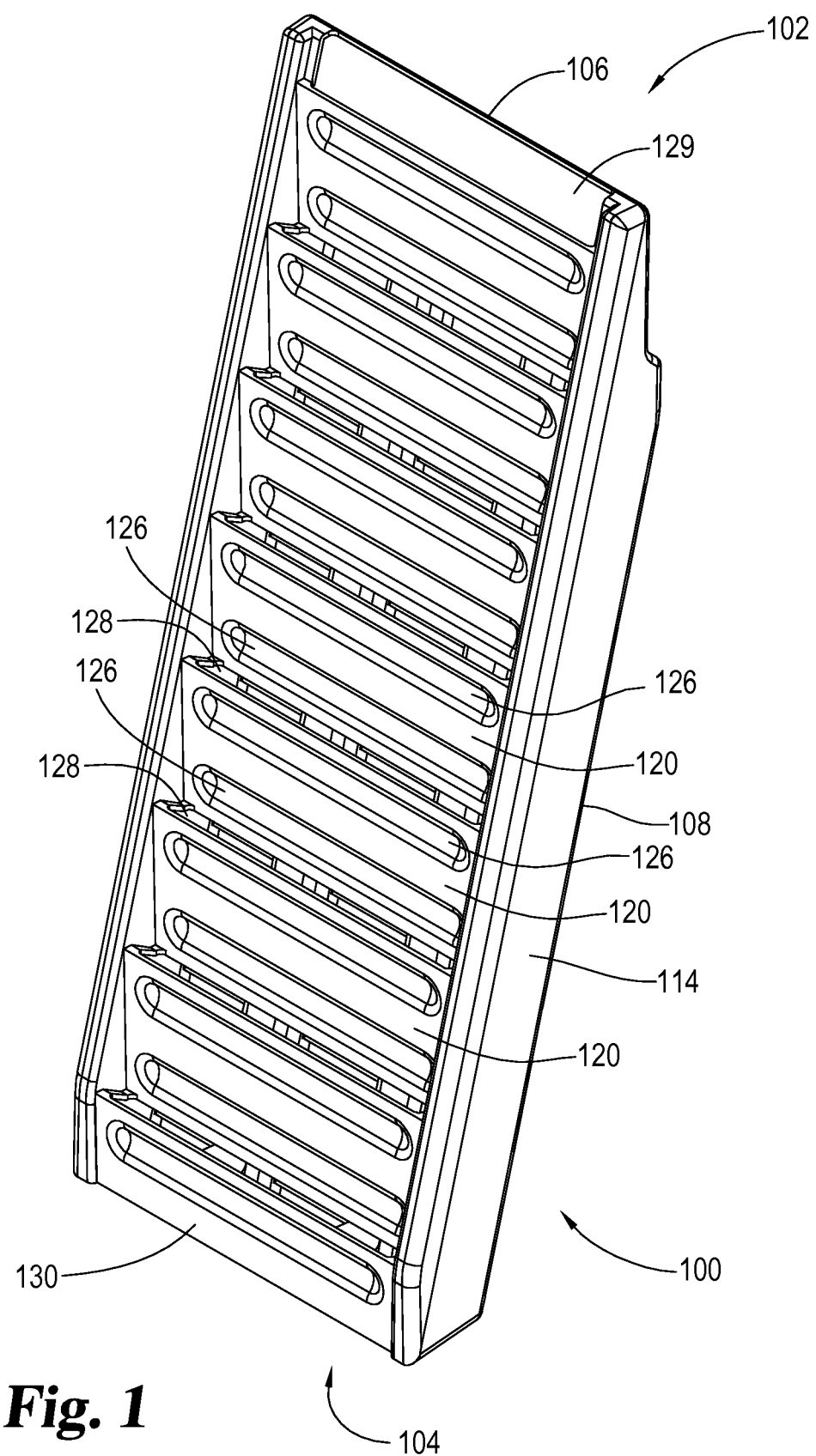
FIG. 1 is a front perspective view of a containment unit.
Figure 2:
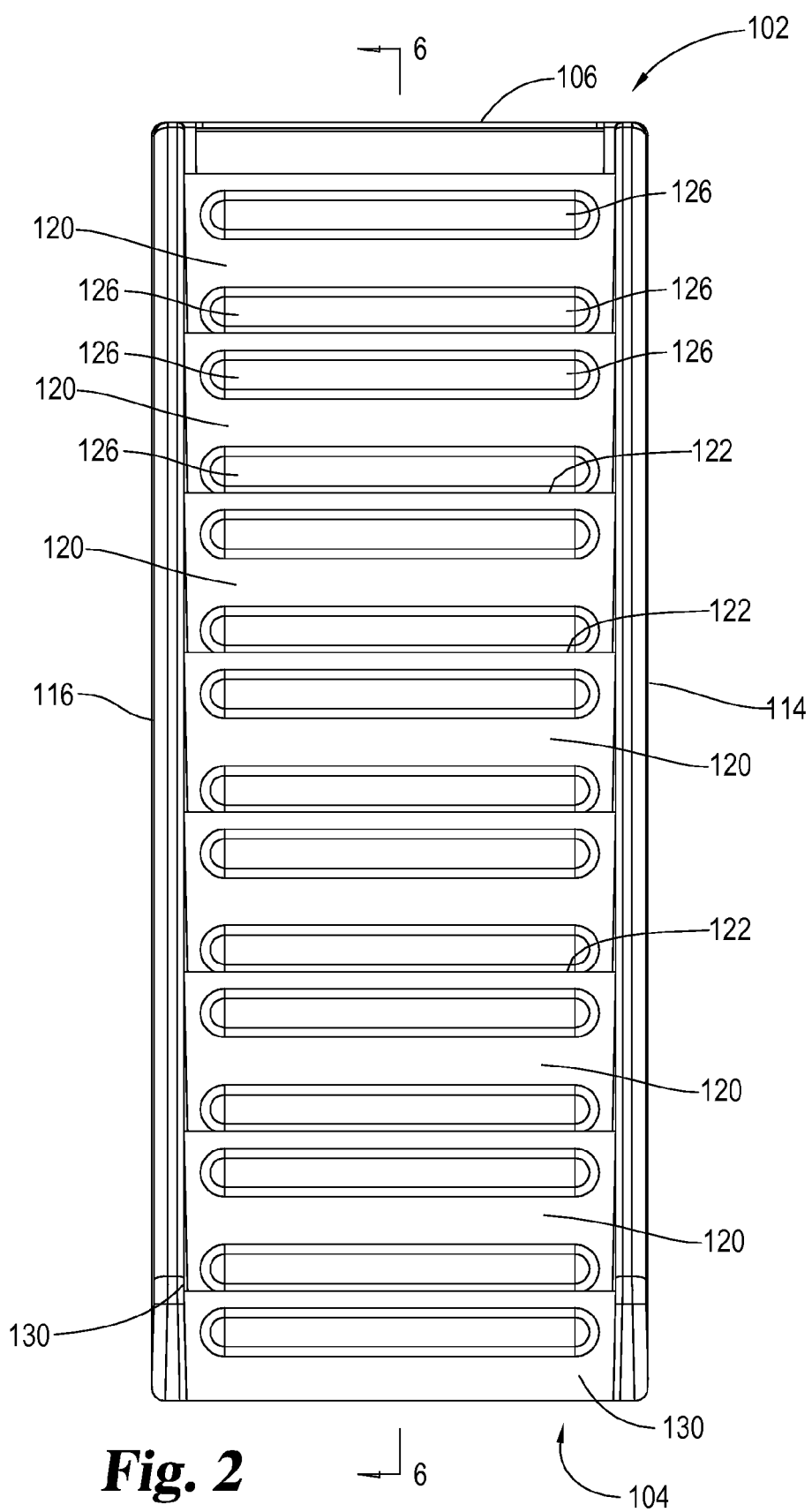
FIG. 2 is a front elevational view of the FIG. 1 containment unit.

For the purpose of promoting an understanding of the disclosure, reference will now be made to certain embodiments thereof and specific language will be used to describe the same. It will nevertheless be understood that no limitation of the scope of this disclosure is thereby intended, such alterations, further modifications and further applications of the principles described herein being contemplated as would normally occur to one skilled in the art to which the disclosure relates. In several FIGs., where there are the same or similar elements, those elements may be designated with the same or similar reference numerals.

In certain aspects, the present disclosure provides a living wall system that may utilize a plurality of containment units to form a living wall that covers an area larger than an individual containment unit.

Figure 3:
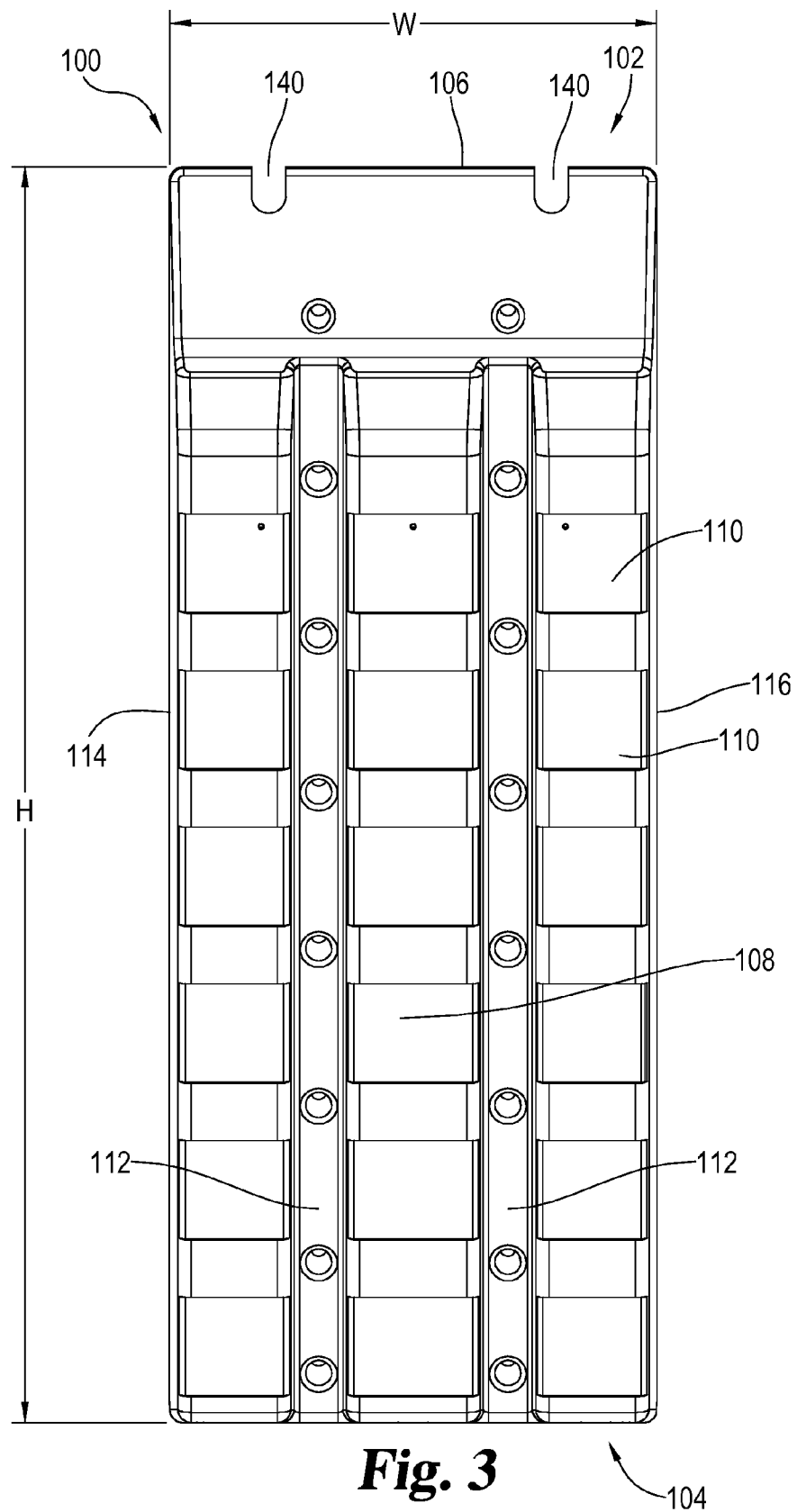
FIG. 3 is a rear elevational view of the FIG. 1 containment unit.
Figure 4:
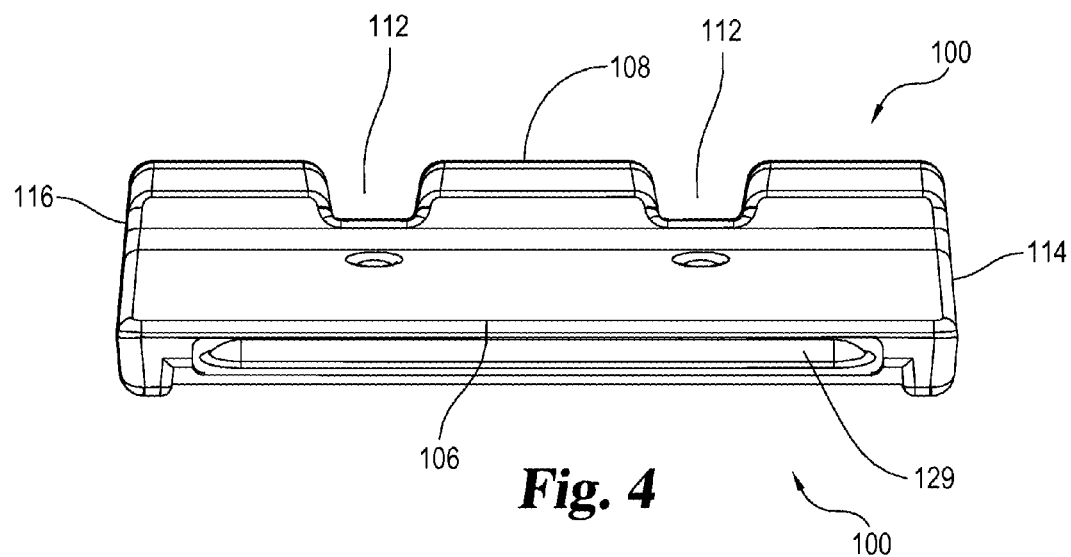
FIG. 4 is a top plan view of the FIG. 1 containment unit.

Referring to FIGS. 1-6, containment unit 100 is illustrated. Containment unit 100 generally has an upper end 102 and a lower end 104, top 106 at upper end 102, rear wall 108, side walls 114 and 116, liquid collection trough 130 and a plurality of ribs 120. As best seen in FIG. 3, rear wall 108 defines a pair of grooves 112 that extend along the longitude and length of rear wall 108 as well as a plurality of recesses 110 that extend horizontally across rear wall 108 perpendicular to longitudinal axis LA.

Figure 6:
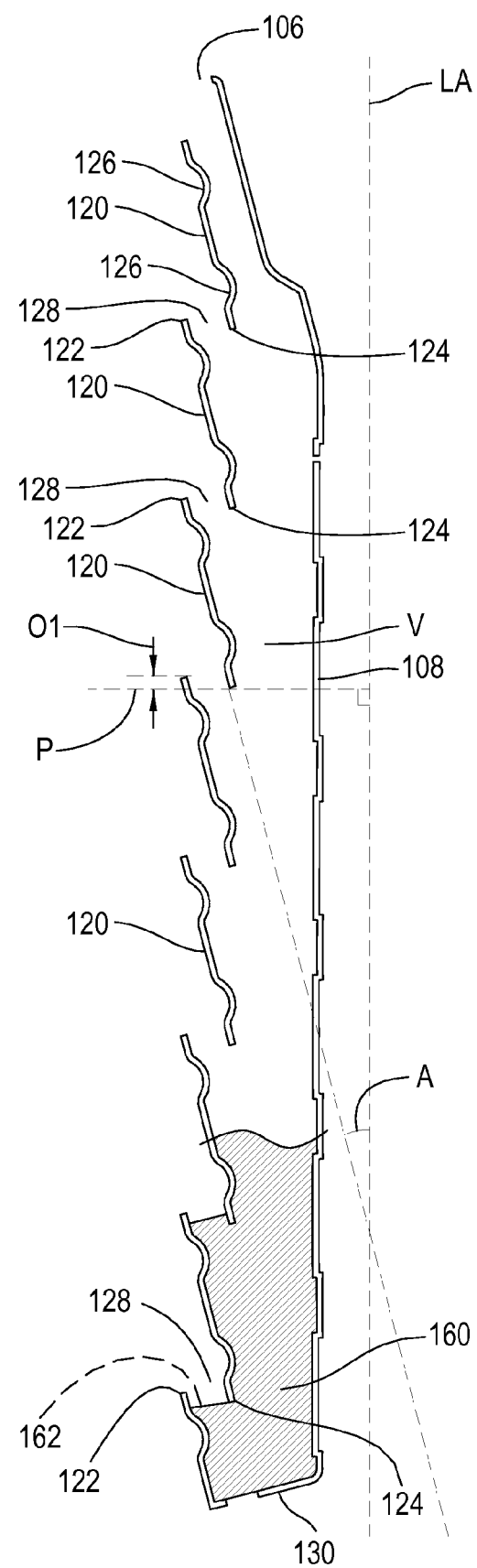
FIG. 6 is a cross-sectional slice of the FIG. 1 containment unit taken at line 6-6 in FIG. 2.

As shown in FIG. 6, side walls 114 and 116 define the longitudinal axis LA. The plurality of ribs 120 each include a top edge 122, a bottom edge 124 and a pair of horizontal grooves 126 that extend substantially across the width of each rib 120. Ribs 120 define a generally planar structure with outer and inner faces that extend between side wall 114 and side wall 116 with the plane of each rib defining an angled axis with respect to the longitudinal axis at angle A. In the illustrated embodiment, angle A is equal to approximately 15 degrees. In alternative embodiments angle A can vary between approximately 5 degrees and approximately 30 degrees.

Each rib is arranged longitudinally between side walls 114 and 116 such that they overlap longitudinally (along the longitudinal axis LA) while defining substantially horizontal openings 128 between the top edge 122 and the bottom edge 124 of sequential ribs. This is best seen in FIG. 6 which shows perpendicular line P that is perpendicular to longitudinal axis LA, intersects a bottom edge 124 of one rib 120 and intersects the next sequental rib 120 below its top surface 122. The overlay is designated with offset O1.

Figure 5:
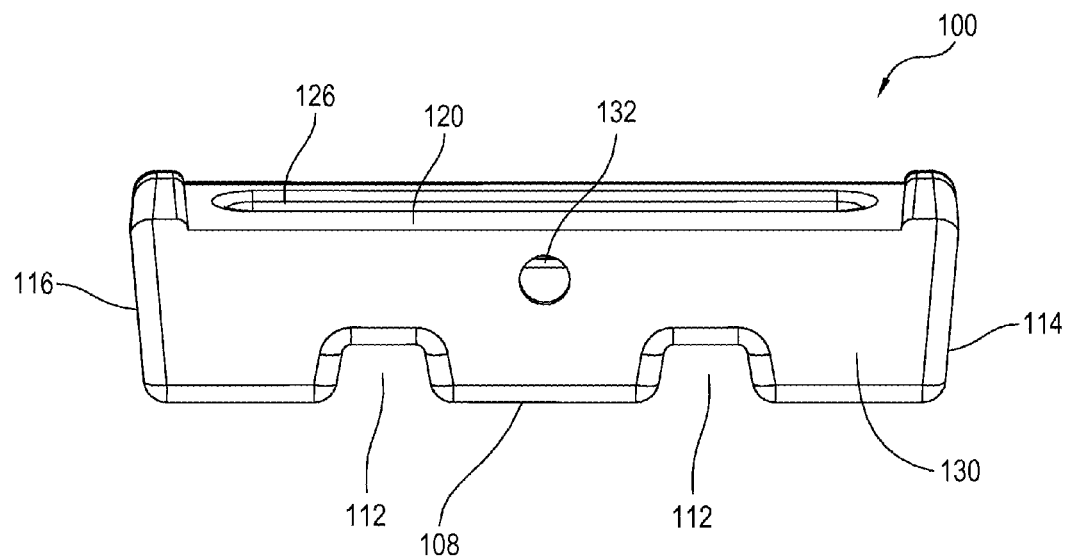
FIG. 5 is a bottom plan view of the FIG. 1 containment unit.

Liquid collection trough 130 is located in the lower end 104 of containment unit 100 and is contiguous with side walls 114 and 116 and rear wall 108. As best shown in FIG. 5, liquid collection trough 130 may optionally include aperture 132, which may be used for coupling a drainage system to containment unit 100 as described below.

Together, top 106, rear wall 108, side walls 114 and 116 and liquid collection trough 130 define interior volume V. Interior volume V is contiguous across the width of containment unit 100 and is contiguous along the longitudinal axis LA of containment unit 100.

As shown in FIG. 3, containment unit 100 has an overall height H and an overall width W. In the illustrated embodiment, height H is more that 2.5 times width W. In other embodiments, height H may be at least twice width W. In yet other embodiments, width W may be greater than height H.

Figure 7:
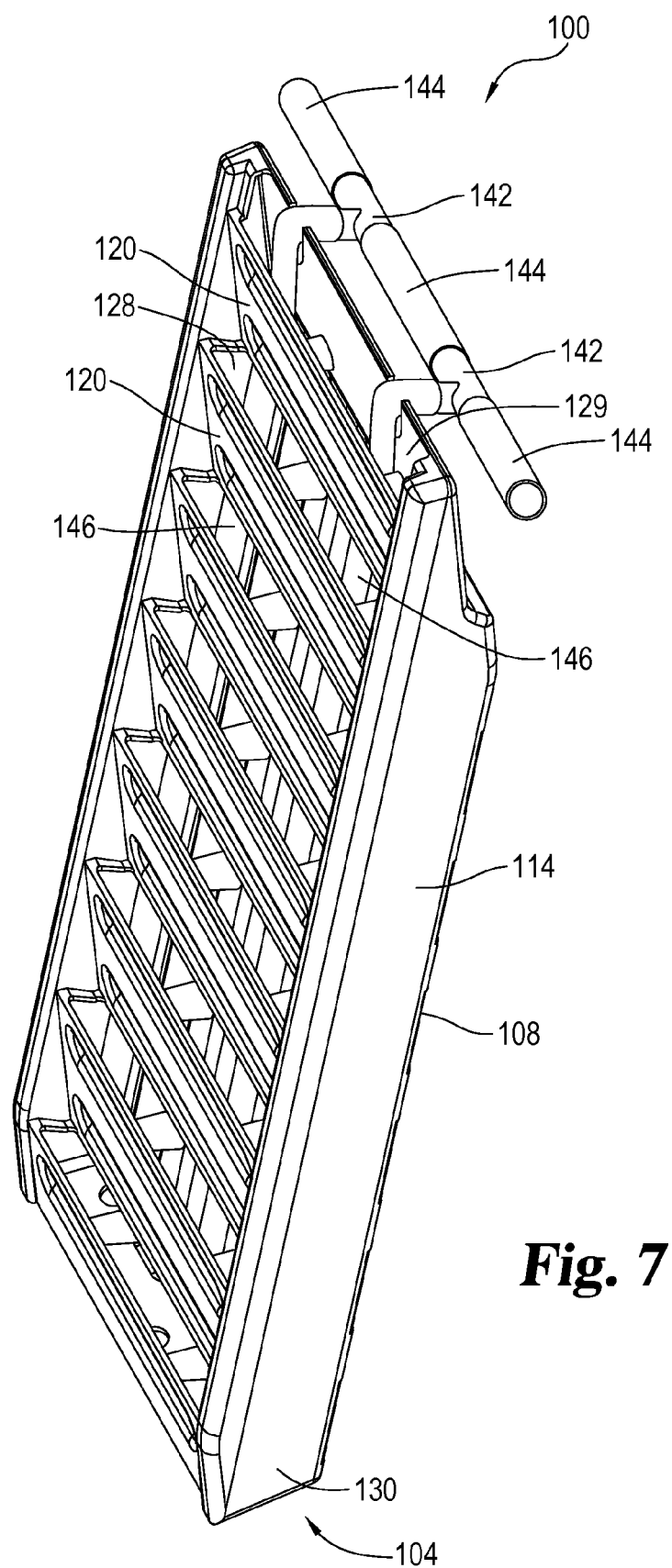
FIG. 7 is a front perspective view of a containment unit including irrigation system piping.
Figure 8:
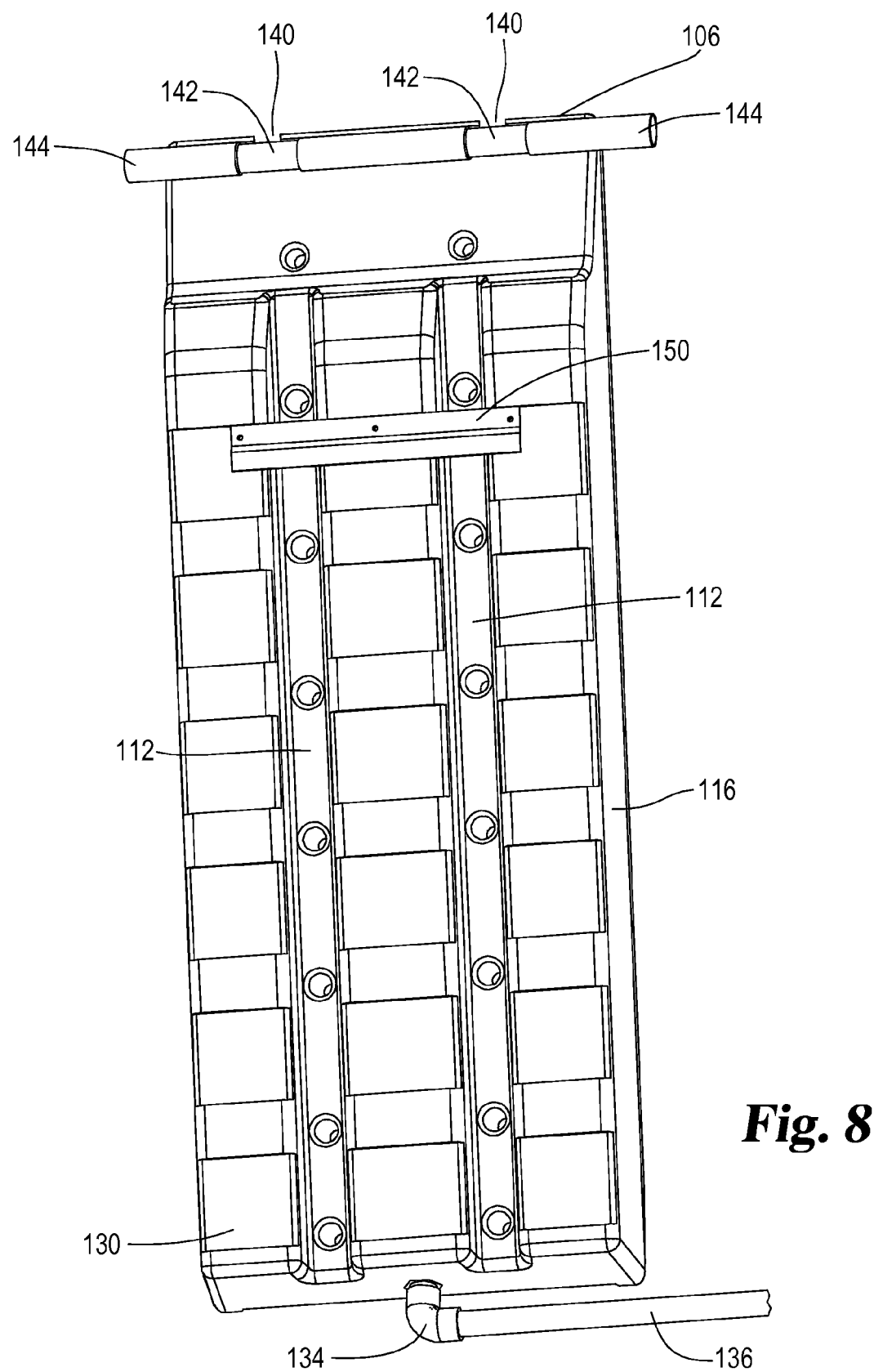
FIG. 8 is a rear perspective view of a containment unit including irrigation system piping and drainage piping.

Referring now to FIGS. 7-9, containment unit 100 is illustrated with irrigation and drainage system components. The illustrated irrigation system includes connector 134 that couples drain 136 to the liquid collection trough through aperture 132 in a water tight manner. Also shown in FIGS. 7-9 are water supply components that include supply pipe 144 connected to components inside containment unit 100 through notches 140 located in the rear wall 108 and coupled with connectors 142 as best seen in FIG. 7. Connectors 142 are coupled to drip lines 146 that extend into interior volume V of containment unit 100.

Referring to FIG. 10, Z-connector 150 is illustrated. Z-connector 150 includes flange 154 and flange 156. Z-connector 150 defines a plurality of holes 152 through flange 154. Z-connector 150 has a thickness T and defines an offset O2 between flange 154 and flange 156. Offset O2 may be at least as wide as thickness T. As shown below, a pair of Z-connectors 150 can be used to mount containment unit 100 on a vertical structure such as a wall. One Z-connector is coupled to rear wall 108 with flange 156 oriented downward while the other Z-connector is coupled to the vertical structure with flange 156 oriented upward. Containment unit 100 may then be mounted by inserting flange 156 on the Z-connector attached to the containment unit into the gap between the vertical structure and the flange 156 mounted on the vertical structure.

Figure 11:
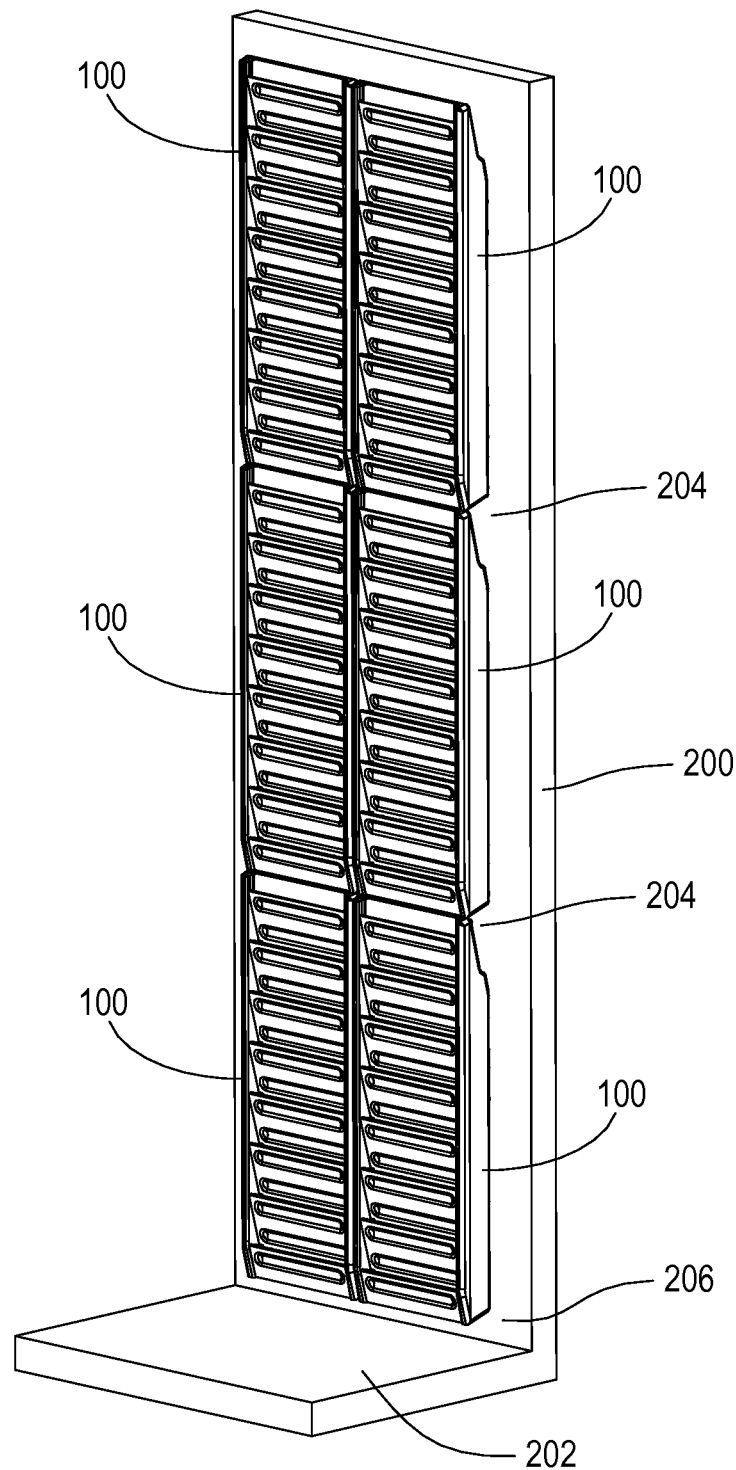
FIG. 11 is a perspective view of six containment units mounted on a wall.

Referring to FIG. 11, a plurality of containment units 100 are illustrated mounted on wall 200. Each containment unit 100 is mounted in close proximity to neighboring containment units 100. In locations where containment units 100 are stacked vertically, sequential containment units define voids 204 that may be used for irrigation piping (supply) and drainage piping. The bottom containment units 100 are spaced apart from floor 202 and define void 206 that may be used for drainage piping.

Together, top 106, rear wall 108, side walls 114 and 116 and liquid collection trough 130 may define a water impregnable barrier such that containment unit 100 may optionally be mounted on wall 200 without additional water barriers between containment unit 100 and wall 200, even when wall 200 is susceptible to water damage.

Figure 12:
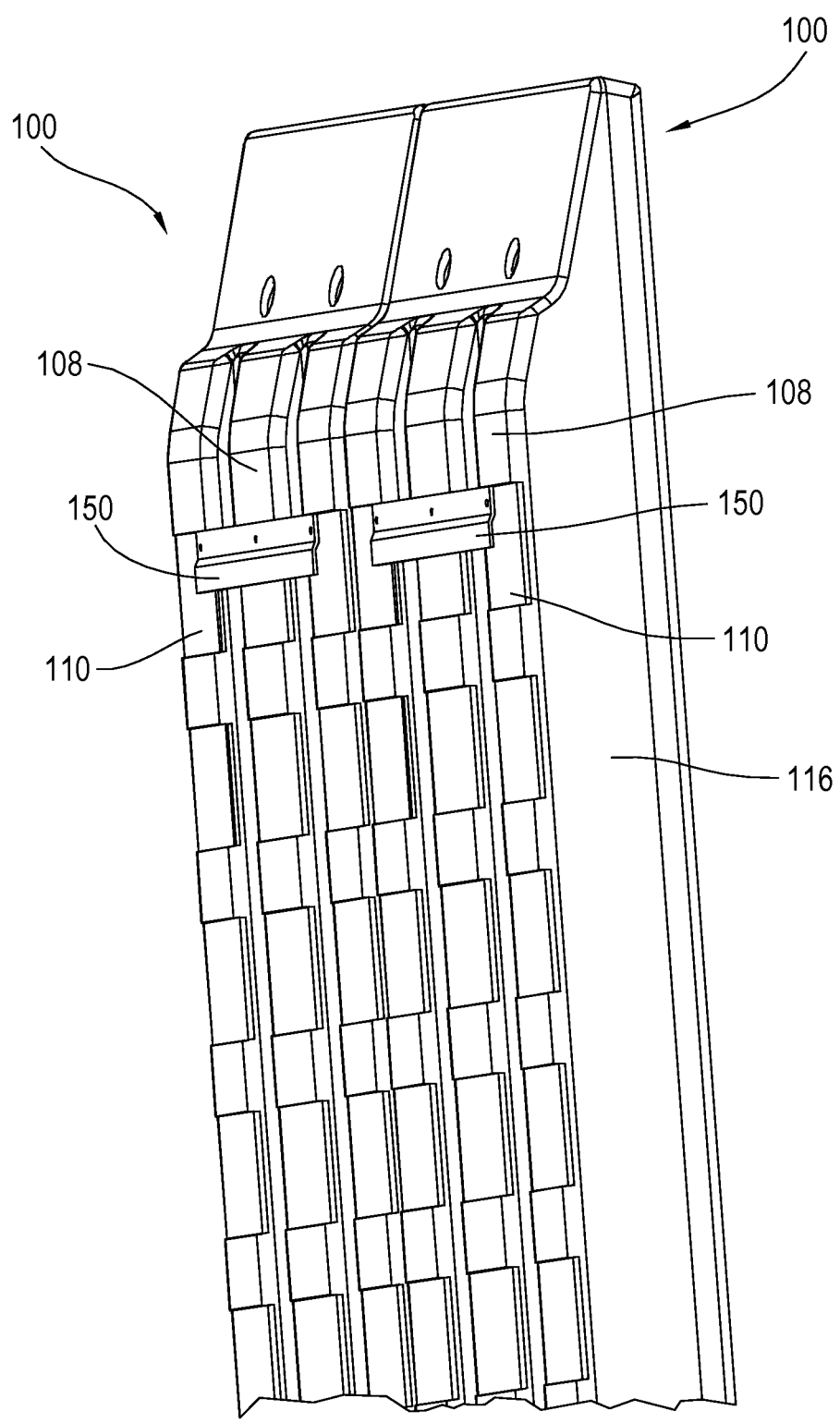
FIG. 12 is a rear perspective view of a pair of containment units with Z-connectors attached.

Referring to FIG. 12, a pair of containment units 100 are illustrated side-by-side. Each containment unit 100 includes a single Z-connector 150 mounted in a recess 110. Recess 110 may have a depth approximately equal to thickness T of Z-connector 150.

Referring to FIG. 6, loose plant growth medium 160 is illustrated in the bottom portion of internal volume V. When a containment unit 100 is mounted in a substantially vertical orientation, as illustrated, internal volume V may be substantially filled with loose plant growth medium 160 to form exposed horizontal growing surfaces 162 positioned in each opening 128 between sequential ribs 120. Plants may then be grown in each opening 128 in containment unit 100. Each opening 128 includes separate overhead space above each opening 128 that may allow near overhead lighting on each horizontal growing surface 162. This configuration may reduce the amount of shade produced by above-planted plants on lower plants, potentially providing individual plants greater access to lighting. Contiguous internal volume V permits the roots of plants growing through separate openings 128 to commingle in internal volume V, which may help create an abundant and even biological rooting environment for plants planted in containment unit 100.

While at least one embodiment has been illustrated and described in detail in the drawings and foregoing description, the same is to be considered as illustrative and not restrictive in character, it being understood that the preferred embodiment has been shown and described and that all changes, equivalents, and modifications that come within the spirit of the inventions defined by following claims are desired to be protected. It will be evident from the specification that aspects or features discussed in one context or embodiment will be applicable in other contexts or embodiments.

I claim:

1. A living wall containment unit for wall mounting in a substantially vertical orientation, the containment unit comprising:
   a rear wall having upper and lower ends, first and second sides;
   a first side wall extending forward from said rear wall along said first side;
   a second side wall extending forward from said rear wall along said second side, wherein said rear wall and said first and second side walls define a longitudinal axis; and
   a plurality of ribs spaced forward of said rear wall and extending between said first and second side walls, wherein each rib includes a top edge and a bottom edge, wherein said plurality of ribs are sequentially arranged longitudinally between said first and second side walls, wherein said plurality of ribs are oriented at an angle with respect to the longitudinal axis; and wherein said plurality of ribs define a plurality of openings located between said top edge and bottom edge of sequentially arranged ribs;
   wherein said rear wall, said plurality of ribs and said first and second side walls together define an interior space adapted to receive loose plant growth medium that substantially fills the interior space wherein the interior space defines a continuous volume along the longitudinal axis such that the interior space is filled with loose plant growth medium and plants are planted such that the roots of different plants planted through different openings are permitted to commingle in the loose plant growth medium, and wherein, when filled with loose plant growth medium and with the containment unit positioned in a substantially vertical orientation, the loose plant growth medium will form a plurality of substantially horizontal growing surfaces positioned to allow plant material to grow through the plurality of openings defined between sequential ribs.

2. The containment unit of claim 1, further comprising a liquid collection trough positioned below the bottom-most rib, the rear wall and the first and second side walls.

3. The containment unit of claim 2, wherein said liquid collection trough, said rear wall, said plurality of ribs and said first and second side walls are unitarily constructed from a single piece.

4. The containment unit of claim 3, wherein said liquid collection trough, said rear wall, and said first and second side walls define a water impregnable barrier such that the containment unit is mountable on a wall without additional water barriers between the containment unit and the wall.

5. The containment unit of claim 2, further comprising a drain pipe connected to an aperture in said liquid collection trough.

6. The containment unit of claim 5, further comprising a drip tube irrigation line that extends in the interior space along the rear wall past each of the plurality of ribs.

7. The containment unit of claim 1, wherein the containment unit is unitarily constructed of molded plastic.

8. The containment unit of claim 7, wherein the containment unit is formed by rotational molding.

9. The containment unit of claim 1, wherein the plurality of ribs are oriented at an angle with respect to the longitudinal axis between approximately 5 degrees and approximately 30 degrees.

10. The containment unit of claim 1, wherein the containment unit has an overall height that is at least twice an overall width of the containment unit.

11. The containment unit of claim 1, wherein, when viewed along an axis perpendicular to the longitudinal axis, adjacent ribs overlap in height such that the top edge of each sequentially lower rib is higher in height than the bottom edge of higher rib.

12. A system for sustaining a living wall, the system comprising:
a containment unit comprising:
a rear wall having upper and lower ends, first and second sides;
a first side wall extending forward from said rear wall along said first side;
a second side wall extending forward from said rear wall along said second side, wherein said rear wall and said first and second side walls define a longitudinal axis;
a plurality of ribs spaced forward of said rear wall and extending between said first and second side walls, wherein each rib includes a top edge and a bottom edge, wherein said plurality of ribs are sequentially arranged longitudinally between said first and second side walls, wherein said plurality of ribs are oriented at an angle with respect to the longitudinal axis; and wherein said plurality of ribs define a plurality of openings located between said top edge and bottom edge of sequentially arranged ribs;
a liquid collection trough positioned below the bottom-most rib, the rear wall and the first and second side walls, wherein said rear wall; and
a loose plant growth medium that substantially fills an interior space of said containment unit defined by said plurality of ribs, said liquid collection trough and said first and second side walls, wherein the interior space defines a continuous volume along the longitudinal axis such that the interior space is filled with loose plant growth medium and planted plants, such that the roots of different plants planted through different openings are permitted to commingle in the loose plant growth medium; and, wherein the loose plant growth medium forms a plurality of substantially horizontal growing surfaces positioned in the plurality of openings defined between sequential ribs when the containment unit is positioned in a substantially vertical orientation.

13. The system of claim 12, wherein said liquid collection trough, said rear wall, said plurality of ribs and said first and second side walls are unitarily constructed from a single piece.

14. The system of claim 12, wherein the containment unit is unitarily constructed of molded plastic.

15. The system of claim 12, further comprising a drain pipe connected to an aperture in said liquid collection trough.

16. The system of claim 15, further comprising a drip tube irrigation line that extends in the interior space of said containment unit along the rear wall past each of the plurality of ribs.

17. The system of claim 12, wherein the plurality of ribs are oriented at an angle with respect to the longitudinal axis between approximately 5 degrees and approximately 30 degrees.

18. The system of claim 12, wherein said liquid collection trough, said rear wall, and said first and second side walls define a water impregnable barrier such that the containment unit is mountable on a wall without additional water barriers between the containment unit and the wall.

19. A living wall containment unit for wall mounting comprising:
a rear wall having upper and lower ends, first and second sides;
a first side wall extending forward from said rear wall along said first side;
a second side wall extending forward from said rear wall along said second side, wherein said rear wall and said first and second side walls define a longitudinal axis; and
a plurality of ribs and extending between said first and second side walls, wherein each rib includes a top edge spaced forward of said rear wall and a bottom edge spaced forward of said rear wall, wherein said plurality of ribs are sequentially arranged longitudinally between said first and second side walls, wherein said plurality of ribs are oriented at an angle with respect to the longitudinal axis; and wherein said plurality of ribs define a plurality of openings located between said top edge and bottom edge of sequentially arranged ribs;
wherein said rear wall, said plurality of ribs and said first and second side walls together define an interior space having a continuous volume along the longitudinal axis filled with plant growth medium commingled within the continuous volume, and wherein the plant growth medium forms a plurality of substantially horizontal growing surfaces positioned to allow plant material to grow through the plurality of openings defined between sequential ribs and wherein the roots of plants planted in the horizontal openings are permitted to commingle with roots of plants planted in other horizontal openings within said continuous volume.

* * * * *